(12) United States Patent
Mazinani et al.

(10) Patent No.: US 12,335,721 B2
(45) Date of Patent: Jun. 17, 2025

(54) METHODS PROVIDING BOOTSTRAPPING

(71) Applicant: Telefonaktiebolaget LM Ericsson (publ), Stockholm (SE)

(72) Inventors: Helena Vahidi Mazinani, Lund (SE); Vesa Lehtovirta, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

(21) Appl. No.: 17/774,197

(22) PCT Filed: Oct. 30, 2020

(86) PCT No.: PCT/EP2020/080495
§ 371 (c)(1),
(2) Date: May 4, 2022

(87) PCT Pub. No.: WO2021/094103
PCT Pub. Date: May 20, 2021

(65) Prior Publication Data
US 2022/0377546 A1    Nov. 24, 2022

Related U.S. Application Data

(60) Provisional application No. 62/933,888, filed on Nov. 11, 2019.

(51) Int. Cl.
*H04W 12/06* (2021.01)
*H04W 12/041* (2021.01)
(Continued)

(52) U.S. Cl.
CPC ......... *H04W 12/06* (2013.01); *H04W 12/041* (2021.01); *H04W 12/0431* (2021.01); *H04W 12/10* (2013.01)

(58) Field of Classification Search
CPC ............... H04W 12/06; H04W 12/041; H04W 12/0431; H04W 12/10; H04W 12/062
See application file for complete search history.

(56) References Cited

U.S. PATENT DOCUMENTS 9,439,067 B2 *  9/2016  Cherian .............. H04L 63/0892
2016/0127903 A1 *  5/2016  Lee ........................ H04W 12/06
713/168

(Continued)

FOREIGN PATENT DOCUMENTS

WO    2018077607 A1    5/2018

OTHER PUBLICATIONS

3GPP TS 23.502 V16.2.0 (Sep. 2019); 3rd Generation Partnership Project; Technical Specification Group Services and System Aspects; Procedures for the 5G System (5GS); Stage 2 (Release 16) (Year: 2019).*

(Continued)

Primary Examiner — Carl G Colin
Assistant Examiner — Andrew Suh
(74) Attorney, Agent, or Firm — Sage Patent Group

(57) ABSTRACT

A method of providing authentication at a communication device is provided. A primary authentication is run with a Trusted Non-3GPP Gateway Function TNGF node to obtain a TNGF Key ($K_{TNGF}$). A re-authentication Root Key (rRK) is provided based on the TNGF key. A re-authentication Master Session Key (rMSK1) is derived based on the re-authentication Root Key. A security setup is performed with a Trusted Non-3GPP Access Point TNAP using the re-authentication Master Session Key. Related methods of performing authentication using a Trusted Non-3-GPP Gateway Function are also discussed.

20 Claims, 18 Drawing Sheets

(51) Int. Cl.
H04W 12/0431 (2021.01)
H04W 12/062 (2021.01)
H04W 12/10 (2021.01)

(56) References Cited

U.S. PATENT DOCUMENTS

| | | | |
|---|---|---|---|
| 2018/0184297 A1* | 6/2018 | Mohamed | H04W 12/062 |
| 2019/0149329 A1* | 5/2019 | Wu | H04W 4/70 |
| | | | 713/155 |
| 2020/0280435 A1* | 9/2020 | Lehtovirta | H04L 9/0822 |
| 2022/0159460 A1* | 5/2022 | Ben Henda | H04W 12/084 |
| 2023/0231720 A1* | 7/2023 | Kunz | H04W 12/0431 |
| | | | 713/155 |

OTHER PUBLICATIONS

International Search Report and Written Opinion of the International Searching Authority, PCT/EP2020/080495, mailed Dec. 11, 2020, 10 pages.
Cao, et al "EAP Extensions for the EAP Re-authentication Protocol (ERP)," Internet Engineering Task Force (IETF), Standards Track, Network Zen, Jul. 2012, 47 pages.
3GPP TS 23.502 V16.2.0, 3rd Generation Partnership Project; Technical Specification Group Services and System Aspects; Procedures for the 5G System (5GS); Stage 2 (Release 16), Valbonne, France, Sep. 2019, 525 pages.

* cited by examiner

METHODS PROVIDING BOOTSTRAPPING

CROSS REFERENCE TO RELATED APPLICATIONS

This application is a 35 U.S.C. § 371 national stage application of PCT International Application No. PCT/EP2020/080495 filed on Oct. 30, 2020, which in turn claims domestic priority to U.S. Provisional Patent Application No. 62/933,888, filed on Nov. 11, 2019, the disclosures and contents of which are incorporated by reference herein in their entireties.

TECHNICAL FIELD

The present disclosure relates generally to communications, and more particularly to communication methods and related devices and nodes supporting wireless communications.

BACKGROUND

The 5G system architecture is specified in 3GPP TS 23.501, v.16.2.0, and TS 23.502, v.16.2.0.

It is specified in clause 4.12a.9 of 3GPP TS.23.502 (also referred to as Reference [1]) that Extended Authentication Protocol (EAP) re-authentication (as specified in RFC 6696, also referred to as Reference [2]) may be used for Trusted Non-3GPP Access Point (TNAP) mobility in trusted access.

In the context of trusted non-3GPP access, the Trusted Non-3GPP Gateway Function (TNGF) would take the role as EAP re-authentication server.

This would enable UEs to move from one trusted non-3GPP access point to another without performing a full primary authentication/registration.

EAP Re-authentication Protocol (ERP) provides a method for quick authentication based on a bootstrapping procedure during the primary authentication. During this bootstrapping, a key rRK is derived from the Extended Master Session Key (EMSK). The rRK is later used to derive further keys according to a key hierarchy illustrated in FIG. 7.

In the key hierarchy of FIG. 7, rRK is the re-authentication Root Key, derived from the EMSK (from the EAP authentication); rIK is the re-authentication Integrity Key, derived from the rRK. Used for the integrity protection of all messages between the peer and the ERP server; and rMSK is re-authentication Master Session Key (MSK), derived from the rRK. There are multiple keys of this type (rMSK1, . . . rMSKn). These keys are derived by the ERP server and the peer.

Further, according to 4.12a.9 of 3GPP TS.23.502 (Reference [1]), the key rRK is derived by the Authentication Server Function AUSF during the primary authentication and transferred to the TNGF.

With authentic methods discussed above, however, it may be difficult to use non-EAP based methods (e.g., a 3GPP procedure such as 5G-AKA) for primary authentication.

SUMMARY

According to some embodiments of inventive concepts, a method provides authentication at a communication device. A primary authentication is run with a Trusted Non-3GPP Gateway Function TNGF node to obtain a TNGF Key ($K_{TNGF}$). A re-authentication Root Key (rRK) is provided based on the TNGF key. A re-authentication Master Session Key (rMSK1) is derived based on the re-authentication Root Key. A security setup is performed with a Trusted Non-3GPP Access Point TNAP using the re-authentication Master Session Key.

According to some embodiments of inventive concepts, a method performs authentication using a Trusted Non-3GPP Gateway Function TNGF. A primary authentication is run with a communication device to obtain a TNGF Key ($K_{TNGF}$). A re-authentication Root Key (rRK) is provided based on the TNGF key. A re-authentication Master Session Key (rMSK1) is derived based on the re-authentication Root Key. The re-authentication Master Session Key is transmitted to a Trusted Non-3GPP Access Point TNAP to support a security setup between the TNAP and the communication device.

According to some embodiments of inventive concepts, a communication device includes processing circuitry and memory coupled with the processing circuitry. The memory includes instructions that when executed by the processing circuitry causes the communication device to run a primary authentication with a Trusted Non-3GPP Gateway Function, TNGF, node to obtain a TNGF Key ($K_{TNGF}$), and to provide a re-authentication Root Key (rRK) based on the TNGF key. The memory further includes instructions that when executed by the processing circuitry causes the communication device to derive a re-authentication Master Session Key (rMSK1) based on the re-authentication Root Key, and to perform a security setup with a Trusted Non-3GPP Access Point TNAP using the re-authentication Master Session Key.

According to some embodiments of inventive concepts, a communication device is adapted to run a primary authentication with a Trusted Non-3GPP Gateway Function, TNGF, node to obtain a TNGF Key ($K_{TNGF}$), and to provide a re-authentication Root Key (rRK) based on the TNGF key. The communication device is further adapted to derive a re-authentication Master Session Key (rMSK1) based on the re-authentication Root Key, and to perform a security setup with a Trusted Non-3GPP Access Point TNAP using the re-authentication Master Session Key.

According to some embodiments of inventive concepts, a network node includes processing circuitry and memory coupled with the processing circuitry. The memory includes instructions that when executed by the processing circuitry causes the network node to run a primary authentication with a communication device (300) to obtain a TNGF Key ($K_{TNGF}$), and to provide a re-authentication Root Key (rRK) based on the TNGF key. The memory further includes instructions that when executed by the processing circuitry causes the network node to derive a re-authentication Master Session Key (rMSK1) based on the re-authentication Root Key, and to transmit the re-authentication Master Session Key to a Trusted Non-3GPP Access Point TNAP to support a security setup between the TNAP and the communication device.

According to some embodiments of inventive concepts, a network node is adapted to run a primary authentication with a communication device (300) to obtain a TNGF Key ($K_{TNGF}$), and to provide a re-authentication Root Key (rRK) based on the TNGF key. The network node is further adapted to derive a re-authentication Master Session Key (rMSK1) based on the re-authentication Root Key, and to transmit the re-authentication Master Session Key to a Trusted Non-3GPP Access Point TNAP to support a security setup between the TNAP and the communication device.

According to some embodiments, a re-authentication Root Key (rRK) provided based on a Trusted Non-3GPP Gateway Function Key ($K_{TNGF}$) can be used for further re-authentication using either ERP procedures or 3GPP procedures (such as 5G-AKA). Moreover, such methods may be implemented without affecting procedures for primary authentication and/or without affecting network AMF and/or AUSF operations.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4A:
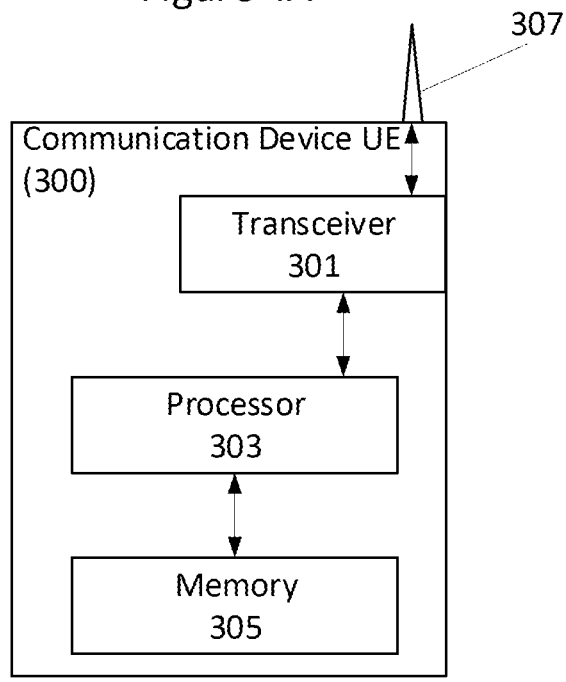
FIG. 4A is a block diagram illustrating a communication device (also referred to as a wireless device or user equipment UE) according to some embodiments of inventive concepts.

FIG. 4A is a block diagram illustrating elements of a communication device UE 300 (also referred to as a wireless device, a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device QQ110 of FIG. 8.) As shown, communication device UE may include an antenna 307 (e.g., corresponding to antenna QQ111 of FIG. 8), and transceiver circuitry 301 (also referred to as a transceiver, e.g., corresponding to interface QQ114 of FIG. 8) including a transmitter and a receiver configured to provide uplink and downlink radio communications with a base station(s) (e.g., corresponding to network node QQ160 of FIG. 8, also referred to as a RAN node) of a radio access network. Communication device UE may also include processing circuitry 303 (also referred to as a processor, e.g., corresponding to processing circuitry QQ120 of FIG. 8) coupled to the transceiver circuitry, and memory circuitry 305 (also referred to as memory, e.g., corresponding to device readable medium QQ130 of FIG. 8) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or wireless device UE may be incorporated in a vehicle.

As discussed herein, operations of communication device 300 may be performed by processing circuitry 303 and/or transceiver circuitry 301. For example, processing circuitry 303 may control transceiver circuitry 301 to transmit communications through transceiver circuitry 301 over a radio interface to a Trusted Non-3GPP Access Point TNAP (also referred to as a radio access network node or a base station) and/or to receive communications through transceiver circuitry 301 from a TNAP over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 4B:
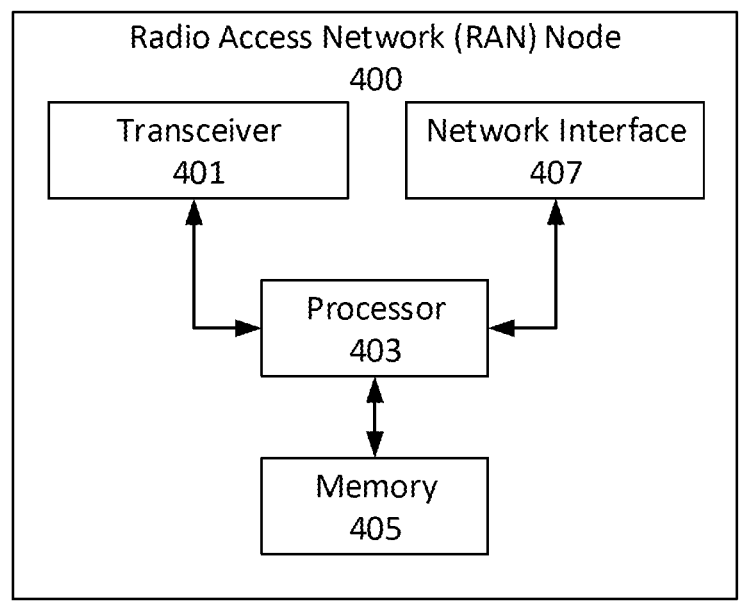
FIG. 4B is a block diagram illustrating a TNAP according to some embodiments of inventive concepts.

FIG. 4B is a block diagram illustrating elements of a TNAP 400 (also referred to as a network node, base station, etc.) configured to provide wireless communication according to embodiments of inventive concepts. As shown, the TNAP may include transceiver circuitry 401 (also referred to as a transceiver) including a transmitter and a receiver configured to provide uplink and downlink radio communications with communication device 300. The TNAP may include network interface circuitry 407 (also referred to as a network interface) configured to provide communications with other nodes (e.g., with other base stations) and/or with core network CN (e.g., with a Trusted Non-3GPP Gateway Function TNGP node). The TNAP may also include processing circuitry 403 (also referred to as a processor) coupled to the transceiver circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the TNAP may be performed by processing circuitry 403, network interface 407, and/or transceiver 401. For example, processing circuitry 403 may control transceiver 401 to transmit downlink communications through transceiver 401 over a radio interface to one or more communication devices UEs and/or to receive uplink communications through transceiver 401 from one or more communication devices UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations.

Figure 4C:
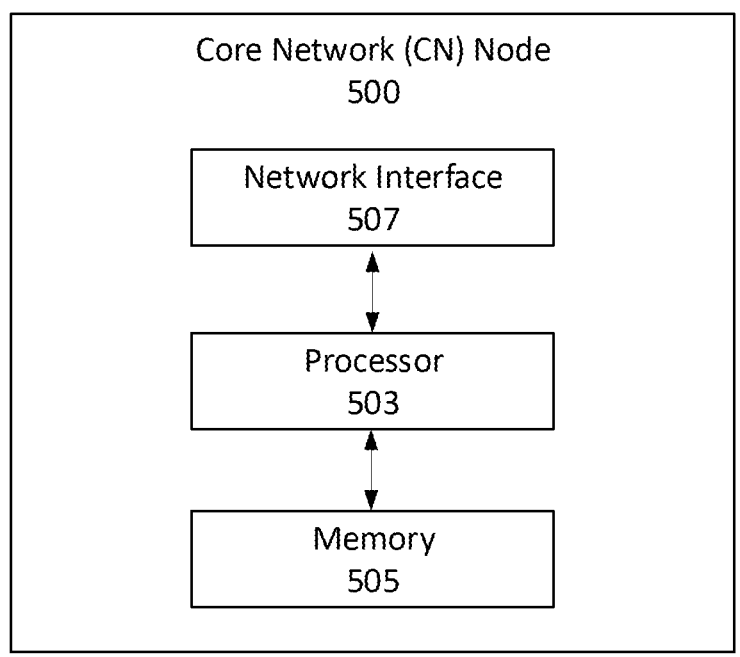
FIG. 4C is a block diagram illustrating a network node (e.g., a TNGF node) according to some embodiments of inventive concepts.

FIG. 4C is a block diagram illustrating elements of a core network CN node (e.g., a TNGF node) of a communication network configured to support wireless communication according to embodiments of inventive concepts. As shown, the CN node may include network interface circuitry 507 (also referred to as a network interface) configured to provide communications with other nodes of the core network and/or TNAPs. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes (e.g., TNAPs) and/or to receive communications through network interface circuitry 507 from one or more other network nodes (e.g., TNAPs). Moreover, modules may be stored in memory 505, and these modules may provide instructions so that when instructions of a module are executed by processing circuitry 503, processing circuitry 503 performs respective operations.

The use of ERP for quick authentication during TNAP mobility may have the following drawbacks discussed below.

According to ERP, the keys for re-authentication are established during the full (primary) authentication performed using EAP. This may mean that only EAP-based methods could be used for primary authentication in case ERP is to be supported for trusted access. This may mean ruling out 5G-AKA, which is the other possible authentication method for 5G in addition to EAP-AKA'. Since an operator may decide to support only one authentication method for authenticating its subscribers, operators who have chosen 5G-AKA may not benefit from ERP.

Current authentication procedures for (trusted) non-3GPP as described in TR 33.807 (Referred to as Reference [3]) do not have support for the ERP extensions. Also, authentication in 5G should be access agnostic. Adding ERP now may mean that existing authentication procedures and network functions could be impacted, which may make it difficult to add ERP afterwards.

According to some embodiments of inventive concepts, an implicit bootstrapping procedure may be provided that establishes a root key for TNAP mobility based on the keys received from primary authentication but without impacting the existing primary authentication procedure. This root key can be used for further re-authentication using either ERP or a 3GPP specific procedure.

Some embodiments of inventive concepts may allow for 5G-AKA to be used as a primary authentication method with the use of ERP in addition to EAP-based methods, with little/no impact on AMF and/or AUSF nor on the current authentication procedures.

According to such embodiments, the key $K_{TNGF}$ (Trusted non-3GPP Gateway Function TNGF Key) received during primary authentication may be used as an anchor key for quick re-authentication in the context of TNAP mobility.

Figure 1:
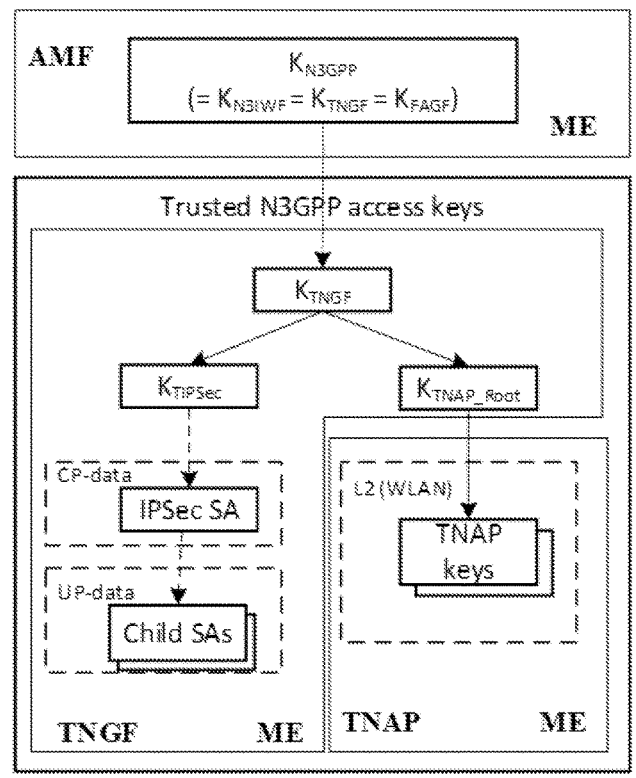
FIG. 1 is a diagram illustrating a key hierarchy according to some embodiments of inventive concepts.

The usage of a key that is already defined in current procedures for trusted non-3GPP access may omit the need for an ERP bootstrapping procedure. This way, no new procedures may need to be defined for primary authentication and there may be little/no impact on AUSF or AMF. In FIG. 1, a dotted line connector (with arrow) between blocks indicates No operation (only key transfer from AMF); a dashed line connector (with arrow) between blocks indicates Used to setup IPSec SA; and a solid line connector (with arrow) between blocks indicates Used for key derivation.

According to some embodiments of inventive concepts, a proposal for a key hierarchy for the trusted non-3GPP access is illustrated in FIG. 1. In this proposed key hierarchy, the key $K_{TNGF}$ is used to derive another key $K_{TNAP\_Root}$. As an option, this extra layer may be omitted so that $K_{TNGF} = K_{TNAP\_Root}$.

The key $K_{TNAP\_Root}$ may be used to generate keys for TNAP mobility in either of the two ways discussed below:
  1. ERP can be used to derive keys for mobility as specified in the RFC 6696 (Reference [2]) with the exception that the bootstrapping is based on the key $K_{TNAP\_Root}$. In this case, $K_{TNAP\_Root}$ corresponds to the key rRK. A solution for this is illustrated in the message diagram of FIGS. 2A and 2B. New operations according to some embodiments are illustrated in operations 2a and 2b.
  2. A new 3GPP specific procedure can be used, where the TNAP keys are derived as specified in the key hierarchy in FIG. 1, but where the procedures for re-authentication use some other protocol than ERP. In this case the TNAP keys can be derived from the $K_{TNAP\_Root}$, using a sequence number and/or an identifier for the TNAP as input using custom 3GPP key derivation functions.

Figure 3:
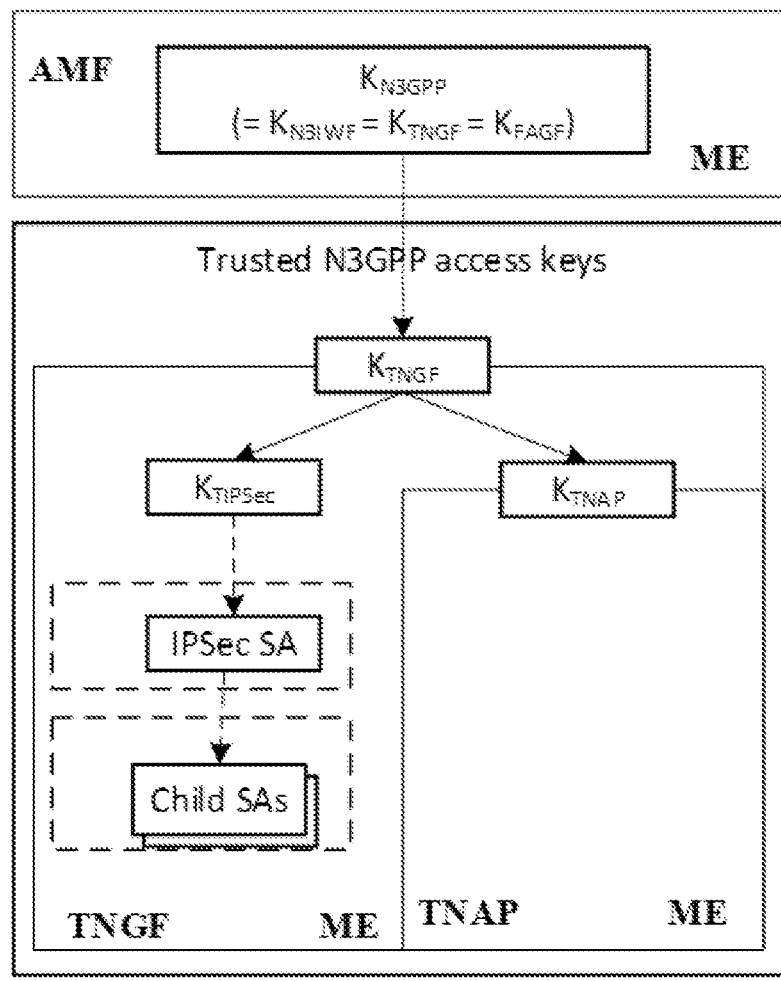
FIG. 3 is a block diagram illustrating a key hierarchy according to some embodiments of inventive concepts.

TNAP mobility is an option according to TS 23.502 (Reference [1]). When TNAP mobility is not configured, only one TNAP key is needed. In that case, the key TNAP_Root ($K_{TNAP\_Root}$) can be used directly omitting the extra layer as illustrated in FIG. 3. As an option, the extra layer may be used, but only one TNAP key is derived from $K_{TNAP\_Root}$. As a third option, TNAP key is derived as described in option 1 above, using the procedures for ERP. In FIG. 3, a dotted line connector (with arrow) between blocks indicates No operation (only key transfer from AMF); a dashed line connector (with arrow) between blocks indicates Used to setup IPSec SA; and a solid line connector (with arrow) between blocks indicates Used for key derivation.

In the proposed key hierarchy supporting TNAP mobility without a full authentication, the key $K_{TNAP\_Root}$ is used as an anchor key to derive further keys for different TNAPs. With ERP notation, $K_{TNAP\_Root}$ corresponds to the rRK.

Figure 2A:
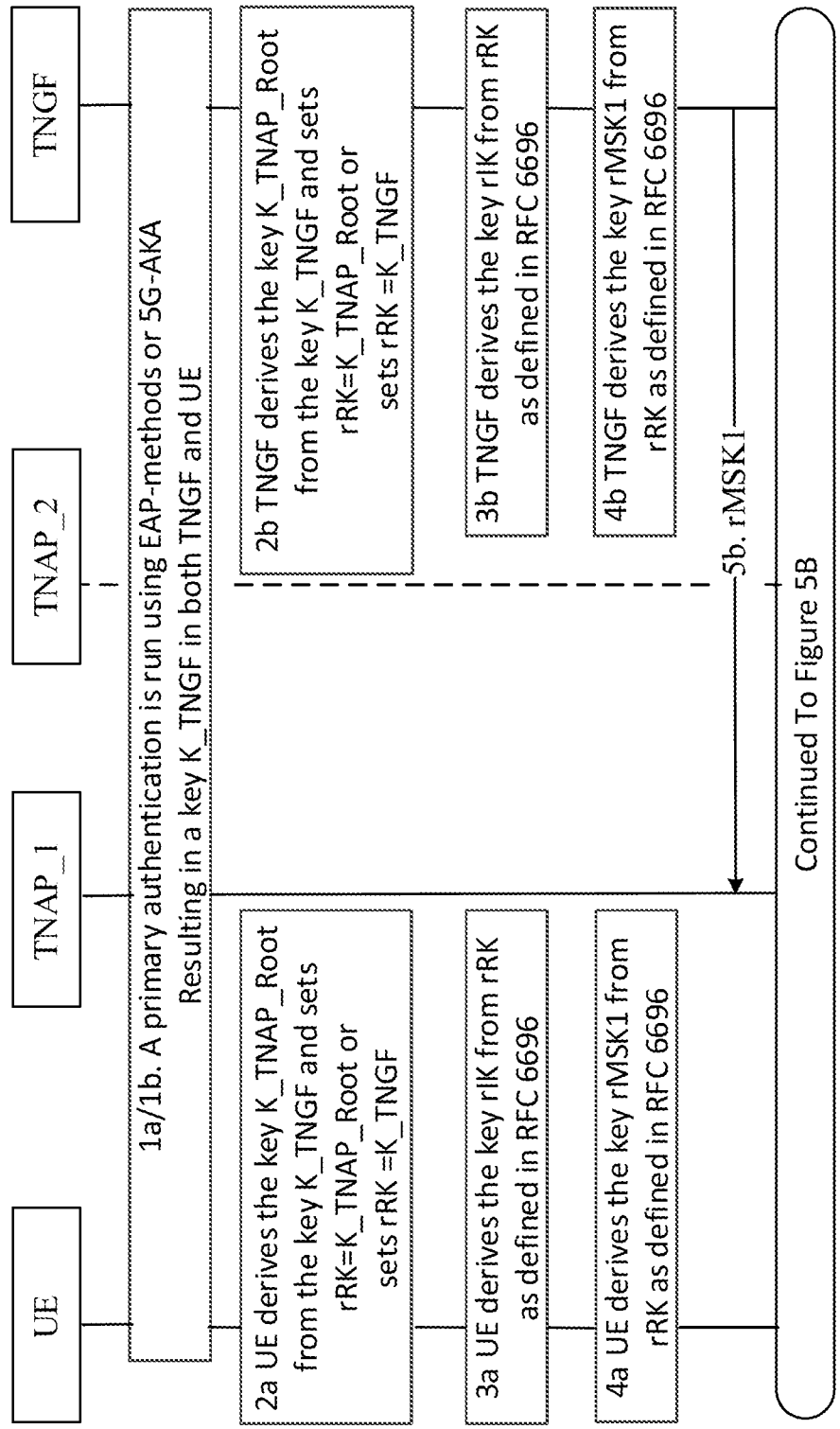
FIGS. 2A and 2B provide a message diagram illustrating bootstrapping according to some embodiments of inventive concepts.
Figure 2B:
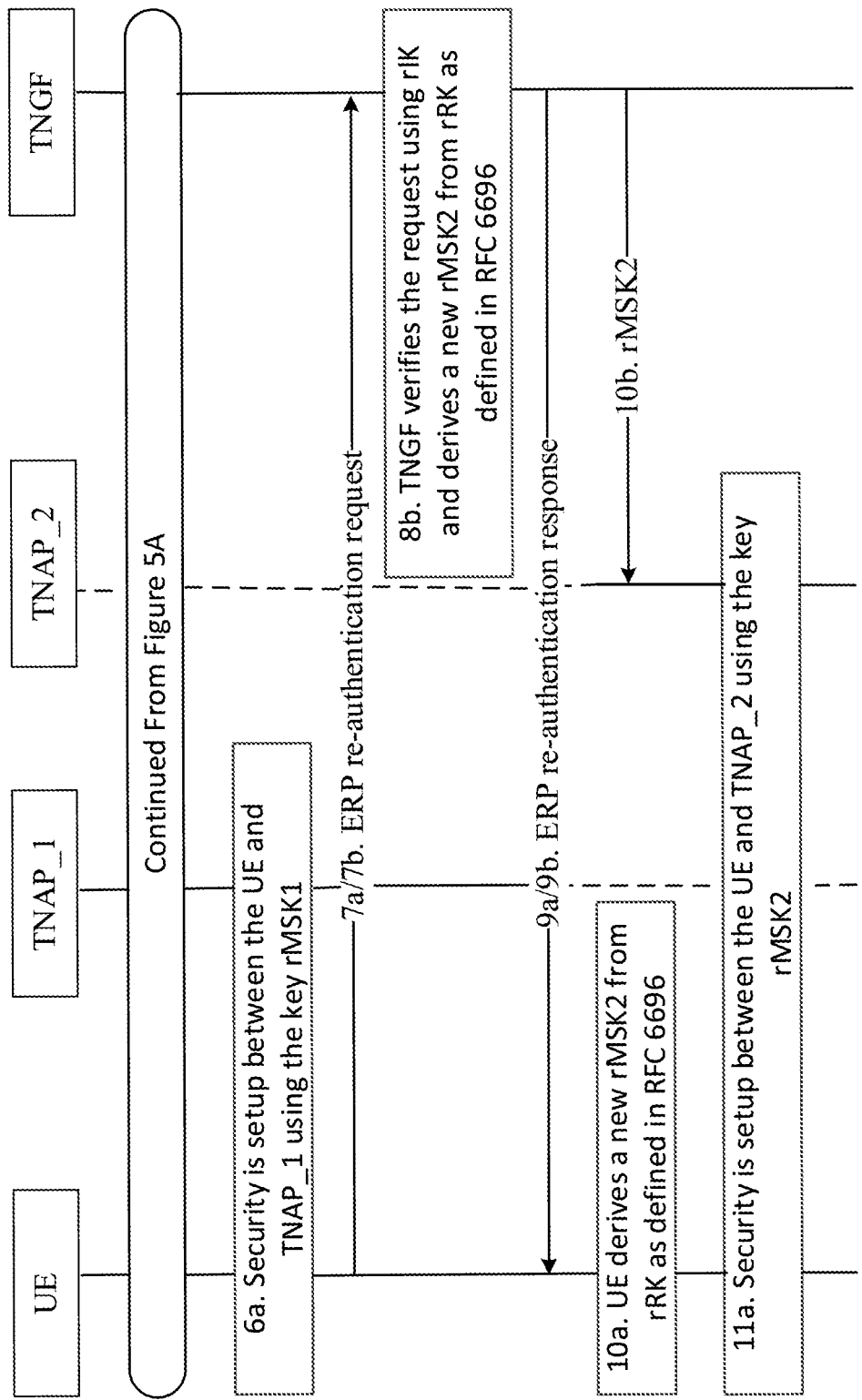

The information flow between UE, TNAP and TNGF for bootstrapping using the $K_{TNGF}$ instead of ERP is discussed below with respect to messages/operations of FIGS. 2A and 2B.

Operation 1a/b. A primary authentication is run between the UE and the home network, resulting in the key $K_{TNGF}$ in both TNGF and UE.

Operation 2a/b. UE (2a) and TNGF (2b) derives the key $K_{TNAP\_Root}$ from the key $K_{TNGF}$ and sets rRK=$K_{TNAP\_Root}$ or sets rRK=$K_{TNGF}$ Operations 3-11a/b. UE and NTGF setup security and performs mobility using ERP.

Some embodiments of inventive concepts may provide methods/to reuse a key from the primary authentication as root key in ERP, thereby omitting an extra bootstrapping procedure for ERP.

Some embodiments of inventive concepts may not significantly affect any of the current procedures for primary authentication, nor any of the network functions AMF or AUSF.

Some embodiments of inventive concepts may allow 5G-AKA to be used for primary authentication, not only EAP-based methods as it is in current solutions.

Operations of communication device 300 (implemented using the structure of the block diagram of FIG. 4A) will now be discussed with reference to the message diagram of FIGS. 2A and 2B and the flow chart of FIG. 5 according to some embodiments of inventive concepts. For example, modules may be stored in memory 305 of FIG. 4A, and these modules may provide instructions so that when the instructions of a module are executed by respective communication device processing circuitry 303, processing circuitry 303 performs respective operations of the flow chart.

At operation 1a, processing circuitry 303 may run a primary authentication with a Trusted Non-3GPP Gateway Function TNGF node to obtain a TNGF Key ($K_{TNGF}$). For example, the primary authentication may be run as a Fifth Generation Authentication and Key Agreement 5G-AKA primary authentication, or the primary authentication may be run as an Extended Authentication Protocol EAP primary authentication.

At operation 2a, processing circuitry 303 may provide a re-authentication Root Key (rRK) based on the TNGF key. For example, the re-authentication Root Key may be provided by deriving a Trusted Non-3GPP Access Point TNAP Root Key ($K_{TNAP\_Root}$) from the TNGF key and setting the re-authentication Root Key equal to the TNAP Root Key (rRK=$K_{TNAP\_Root}$), or the re-authentication Root Key may be provided by setting the re-authentication Root Key equal to the TNGF Key (rRK=$K_{TNGF}$).

At operation 3a, processing circuitry 303 may derive a re-authentication Integrity Key (rIK) based on the re-authentication Root Key (rRK) (e.g., as defined in RFC 6696). At operation 4a, processing circuitry 303 may derive a first re-authentication Master Session Key (rMSK1) based on the re-authentication Root Key (rRK) (e.g., as defined in RFC 6696).

At operation 6a, processing circuitry 303 may perform a first security setup with a first Trusted Non-3GPP Access Point TNAP (TNAP_1) using the first re-authentication Master Session Key (rMSK1). At operation 6.5a, processing circuitry 303 may provide network communication through transceiver 301 and through the first TNAP (TNAP_1) based on the first security setup.

At operation 7a, processing circuitry 303 may transmit a re-authentication request through transceiver 301 and through the first TNAP (TNAP_1) to the TNGF after performing the first security setup. At operation 9a, processing circuitry 303 may receive a re-authentication response from the TNGF through the first TNAP (TNAP_1) and through transceiver 301, wherein the re-authentication response corresponds to the re-authentication request. For example, the re-authentication request may be an Extended Authentication Protocol Re-authentication Protocol ERP re-authentication request, and the re-authentication response may be an ERP re-authentication response.

At operation 10a, processing circuitry 303 may derive a second re-authentication Master Session Key (rMSK2) based on the re-authentication Root Key responsive to receiving the re-authentication response of operation 9a. At operation 11a, processing circuitry 303 may perform a second security setup with a second TNAP (TNAP_2) using the second re-authentication Master Session Key (rMSK2). At operation 12a, processing circuitry 303 may provide network communication through transceiver 301 and through the second TNAP (TNAP_2) based on the second security setup.

Figure 5:
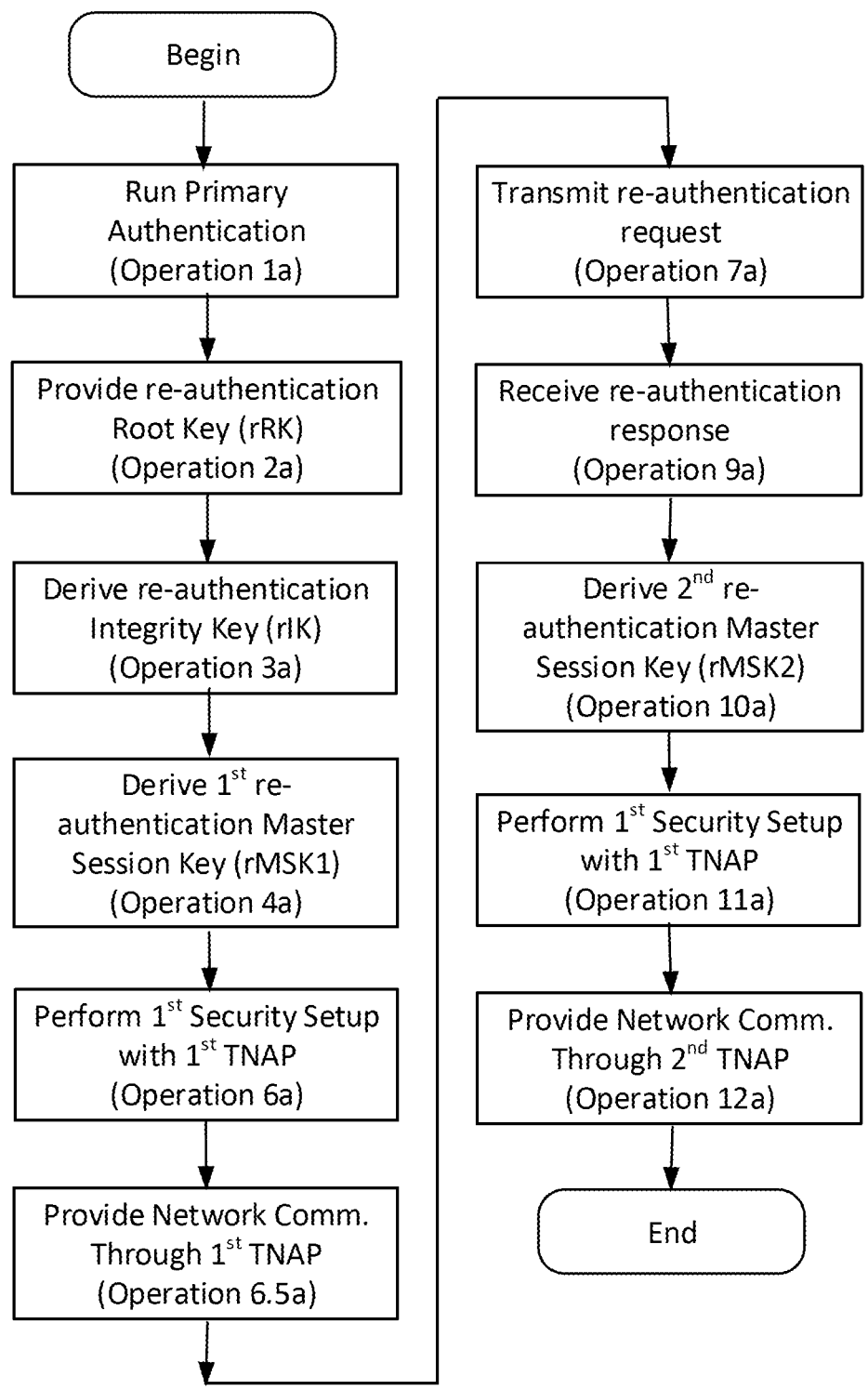
FIG. 5 is a flow chart illustrating operations of a communication device according to some embodiments of inventive concepts.

Various operations from the flow chart of FIG. 5 may be optional with respect to some embodiments of wireless devices and related methods. Regarding methods of example embodiment 1 (set forth below), for example, operations 3a, 6.5a, 7a, 9a, 10a, 11a, and/or 12a of FIG. 5 may be optional.

Operations of a network node 500 (implemented using the structure of FIG. 4C), such as a Trusted Non-3GPP Gateway Function TNGF node will now be discussed with reference to the message diagram of FIGS. 2A and 2B and the flow chart of FIG. 6 according to some embodiments of inventive concepts. For example, modules may be stored in memory 505 of FIG. 4C, and these modules may provide instructions so that when the instructions of a module are executed by respective network node processing circuitry 503, processing circuitry 503 performs respective operations of the flow chart.

At operation 1b, processing circuitry 503 may run a primary authentication with a communication device (300) to obtain a TNGF Key ($K_{TNGF}$). For example, the primary authentication may be run as a Fifth Generation Authentication and Key Agreement 5G-AKA primary authentication, or the primary authentication may be run as an Extended Authentication Protocol EAP primary authentication.

At operation 2b, processing circuitry 503 may provide a re-authentication Root Key (rRK) based on the TNGF key. For example, the re-authentication Root Key may be provided by deriving a Trusted Non-3GPP Access Point TNAP Root Key ($K_{TNAP\_Root}$) from the TNGF key and setting the re-authentication Root Key equal to the TNAP Root Key (rRK=$K_{TNAP\_Root}$), or the re-authentication Root Key may be provided by setting the re-authentication Root Key equal to the TNGF Key (rRK=$K_{TNGF}$).

At operation 3b, processing circuitry 503 may derive a re-authentication Integrity Key (rIK) based on the re-authentication Root Key (rRK). At operation 4b, processing circuitry 503 may derive a first re-authentication Master Session Key (rMSK1) based on the re-authentication Root Key (rRK).

At operation 5b, processing circuitry 503 may transmit the first re-authentication Master Session Key (rMSK1) through network interface 507 to a first Trusted Non-3GPP Access Point TNAP (TNAP_1) to support a security setup between the first TNAP (TNAP_1) and the communication device. At operation 5.5b, processing circuitry 503 may support network communication for the communication device through the TNAP based on the security setup.

At operation 7b, processing circuitry 503 may receive a re-authentication request from the communication device through the first TNAP (TNAP_1) and through network interface 507 after transmitting the first re-authentication Master Session Key to the first TNAP. 21. The re-authentication request may be an ERP re-authentication request.

At operation 8b, processing circuitry 503 may derive a second re-authentication Master Session Key (rMSK2) based on the re-authentication Root Key responsive to receiving the re-authentication request and responsive to verifying the re-authentication request using the a re-authentication Integrity Key.

At operation 9b, processing circuitry 503 may transmit a re-authentication response through the first TNAP (TNAP_1) to the communication device, responsive to receiving the re-authentication request and responsive to verifying the re-authentication request using the a re-authentication Integrity Key. The re-authentication response may be an ERP re-authentication response.

At operation 10b, processing circuitry 503 may transmit the second re-authentication Master Session Key (rMSK2) through network interface 507 to a second TNAP (TNAP_2) responsive to receiving the re-authentication request and responsive to verifying the re-authentication request using the a re-authentication Integrity Key, to support a second security setup between the second TNAP and the communication device. At operation 10.5b, processing circuitry 503 may support network communication for the communication device through the second TNAP (TNAP_2) based on the second security setup.

Figure 6:
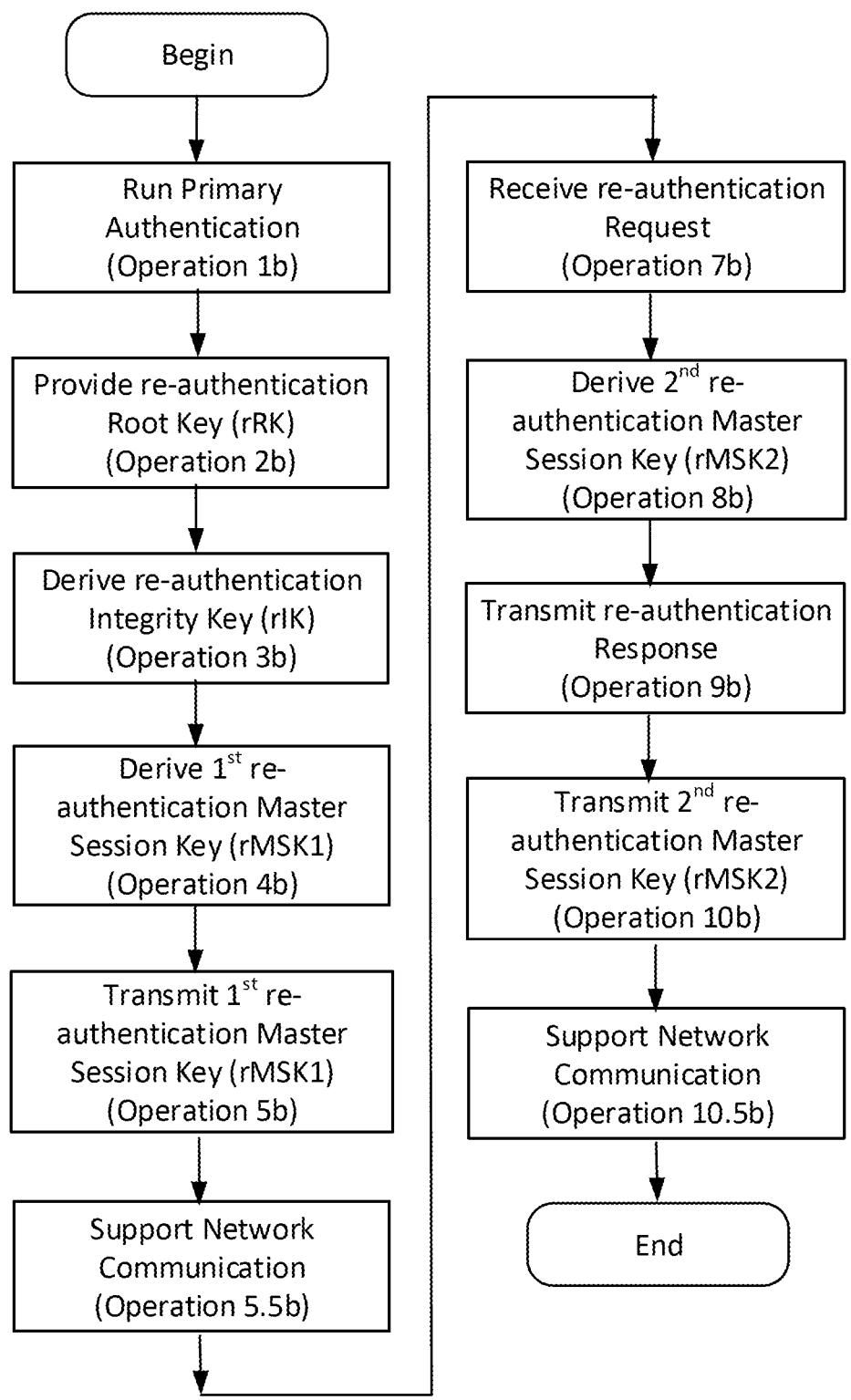
FIG. 6 is a flow chart illustrating operations of a TNGF node according to some embodiments of inventive concepts.
Figure 7:
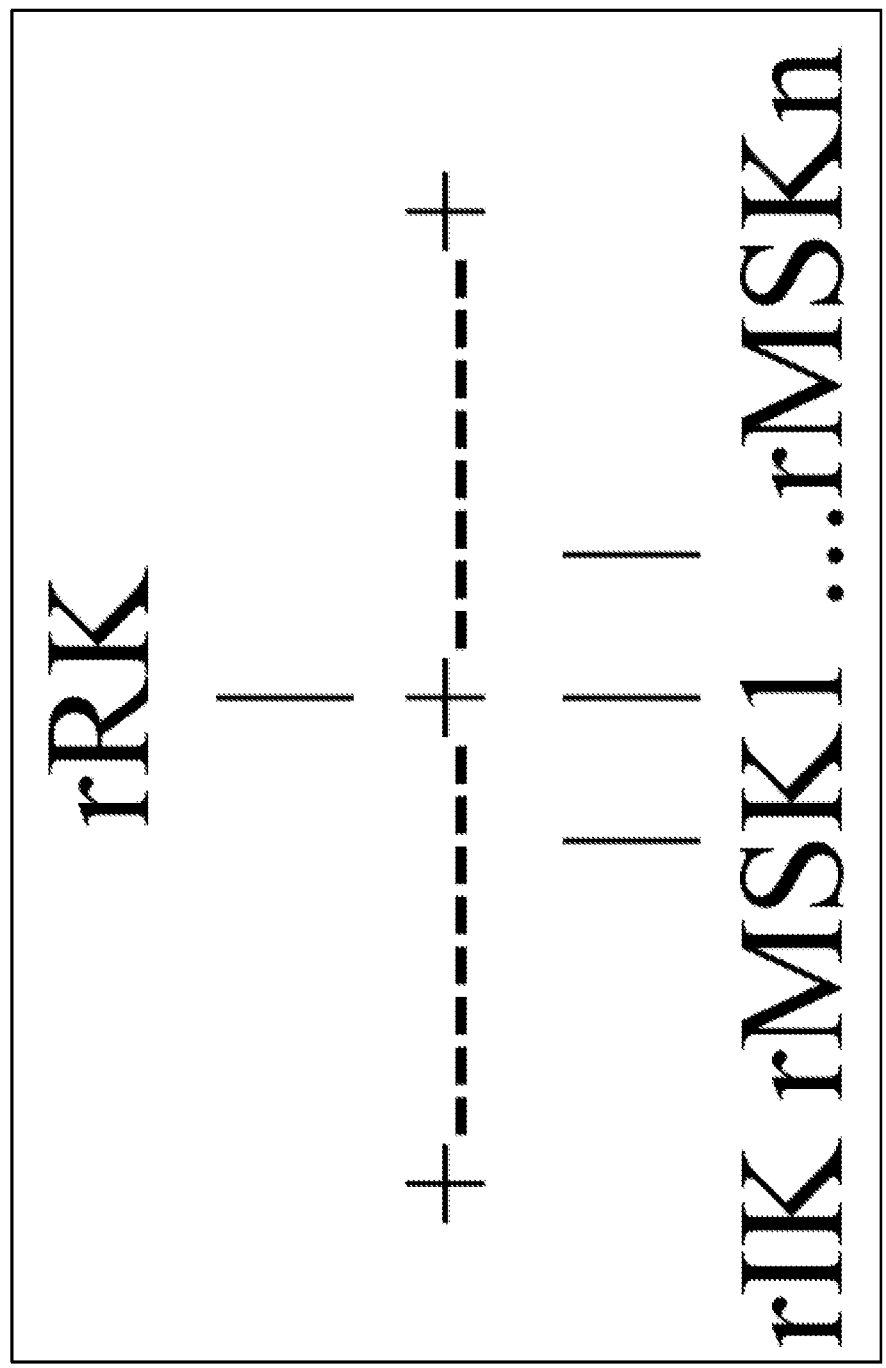
FIG. 7 is a key hierarchy that uses rRK to derive further keys.

Various operations from the flow chart of FIG. 6 may be optional with respect to some embodiments of network nodes and related methods. Regarding methods of example embodiment 12 (set forth below), for example, operations 3b, 5.5b, 7b, 8b, 9b, 10b, and/or 10.5b of FIG. 6 may be optional.

Example embodiments are discussed below.

1. A method of providing authentication at a communication device (300), the method comprising: running (Operation 1a) a primary authentication with a Trusted Non-3GPP Gateway Function, TNGF, node to obtain a TNGF Key ($K_{TNGF}$); providing (Operation 2a) a re-authentication Root Key (rRK) based on the TNGF key; deriving (Operation 4a) a re-authentication Master Session Key (rMSK1) based on the re-authentication Root Key; and performing (Operation 6a) a security setup with a Trusted Non-3GPP Access Point, TNAP, using the re-authentication Master Session Key.

2. The method of Embodiment 1, wherein providing the re-authentication Root Key comprises deriving a Trusted Non-3GPP Access Point, TNAP, Root Key ($K_{TNAP\_Root}$) from the TNGF key, and setting the re-authentication Root Key equal to the TNAP Root Key.

3. The method of Embodiment 1, wherein providing the re-authentication Root Key comprises setting the re-authentication Root Key equal to the TNGF Key.

4. The method of any of Embodiments 1-3 further comprising: deriving (Operation 3a) a re-authentication Integrity Key (rIK) based on the re-authentication Root Key.

5. The method of any of any of Embodiments 1-4 further comprising: providing (Operation 6.5a) network communication through the TNAP based on the security setup.

6. The method of any of Embodiments 1-5, wherein the re-authentication Master Session Key is a first re-authentication Master Session Key, wherein the security set up is a first security setup, and wherein the TNAP is a first TNAP (TNAP_1), the method further comprising: deriving (Operation 10a) a second re-authentication Master Session Key (rMSK2) based on the re-authentication Root Key; and performing (Operation 11a) a second security setup with a second TNAP (TNAP_2) using the second re-authentication Master Session Key.

7. The method of Embodiment 6 further comprising: providing (Operation 12a) network communication through the second TNAP based on the second security setup.

8. The method of any of Embodiments 6-7 further comprising: transmitting (Operation 7a) a re-authentication request through the first TNAP to the TNGF after performing the first security setup; and receiving (Operation 9a) a re-authentication response from the TNGF through the first TNAP, wherein the re-authentication response corresponds to the re-authentication request; wherein the second re-authentication Master Session Key is derived responsive to receiving the re-authentication response.

9. The method of Embodiment 8, wherein the re-authentication request is an Extended Authentication Protocol Re-authentication Protocol, ERP, re-authentication request, and wherein the re-authentication response is an ERP re-authentication response.

10. The method of any of Embodiments 1-9, wherein the primary authentication is run as a Fifth Generation Authentication and Key Agreement, 5G-AKA, primary authentication.

11. The method of any of Embodiments 1-9, wherein the primary authentication is run as an Extended Authentication Protocol, EAP, primary authentication.

12. A method of performing authentication using a Trusted Non-3GPP Gateway Function, TNGF, the method comprising: running (Operation 1b) a primary authentication with a communication device (300) to obtain a TNGF Key ($K_{TNGF}$); providing (Operation 2b) a re-authentication Root Key (rRK) based on the TNGF key; deriving (Operation 4b) a re-authentication Master Session Key (rMSK1) based on the re-authentication Root Key; and transmitting (Operation 5b) the re-authentication Master Session Key to a Trusted Non-3GPP Access Point, TNAP to support a security setup between the TNAP and the communication device.

13. The method of Embodiment 12, wherein providing the re-authentication Root Key comprises deriving a Trusted Non-3GPP Access Point, TNAP, Root Key ($K_{TNAP\_Root}$)

from the TNGF key, and setting the re-authentication Root Key equal to the TNAP Root Key.

14. The method of Embodiment 12, wherein providing the re-authentication Root Key comprises setting the re-authentication Root Key equal to the TNGF Key.

15. The method of any of any of Embodiments 12-14 further comprising: supporting (Operation 5.5b) network communication for the communication device through the TNAP based on the security setup.

16. The method of any of Embodiments 12-15, wherein the re-authentication Master Session Key is a first re-authentication Master Session Key, wherein the security set up is a first security setup, and wherein the TNAP is a first TNAP (TNAP_1), the method further comprising: deriving (Operation 8b) a second re-authentication Master Session Key (rMSK2) based on the re-authentication Root Key; and transmitting (Operation 10b) the second re-authentication Master Session Key to a second TNAP to support a second security setup between the second TNAP and the communication device.

17. The method of Embodiment 16 further comprising: supporting (Operation 10.5b) network communication through the second TNAP based on the second security setup.

18. The method of any of Embodiments 16-17 further comprising: receiving (Operation 7b) a re-authentication request from the communication device through the first TNAP after transmitting the first re-authentication Master Session Key to the first TNAP; and transmitting (Operation 9b) a re-authentication response through the first TNAP to the communication device, responsive to receiving the re-authentication request.

19. The method of Embodiment 18, where the second re-authentication Master Session Key is derived responsive to receiving the re-authentication request.

20. The method of any of Embodiments 18-19 further comprising: deriving (Operation 3b) a re-authentication Integrity Key (rIK) based on the re-authentication Root Key; wherein the second re-authentication Master Session Key (rMSK2) is derived responsive to verifying the re-authentication request using the a re-authentication Integrity Key, and/or wherein the re-authentication response is transmitted responsive to verifying the re-authentication request using the a re-authentication Integrity Key, and/or wherein the second re-authentication Master Session Key is transmitted responsive to verifying the re-authentication request using the a re-authentication Root Integrity Key.

21. The method of any of Embodiments 18-20, wherein the re-authentication request is an Extended Authentication Protocol Re-authentication Protocol, ERP, re-authentication request, and wherein the re-authentication response is an ERP re-authentication response.

22. The method of any of Embodiments 12-21, wherein the primary authentication is run as a Fifth Generation Authentication and Key Agreement, 5G-AKA, primary authentication.

23. The method of any of Embodiments 12-21, wherein the primary authentication is run as an Extended Authentication Protocol, EAP, primary authentication.

24. A communication device (300) comprising: processing circuitry (303); and memory (305) coupled with the processing circuitry, wherein the memory includes instructions that when executed by the processing circuitry causes the communication device to perform operations according to any of Embodiments 1-11.

25. A communication device (300) adapted to perform according to any of Embodiments 1-11.

26. A computer program comprising program code to be executed by processing circuitry (303) of a communication device (300), whereby execution of the program code causes the communication device (300) to perform operations according to any of embodiments 1-11.

27. A computer program product comprising a non-transitory storage medium including program code to be executed by processing circuitry (303) of a communication device (300), whereby execution of the program code causes the communication device (300) to perform operations according to any of embodiments 1-11.

28. A network node (500) comprising: processing circuitry (503); and memory (505) coupled with the processing circuitry, wherein the memory includes instructions that when executed by the processing circuitry causes the network node to perform operations according to any of Embodiments 12-23.

29. A network node (500) adapted to perform according to any of Embodiments 12-23.

30. A computer program comprising program code to be executed by processing circuitry (403) of a network node (500), whereby execution of the program code causes the network node (500) to perform operations according to any of embodiments 12-23.

31. A computer program product comprising a non-transitory storage medium including program code to be executed by processing circuitry (503) of a network node (500), whereby execution of the program code causes the network node (500) to perform operations according to any of embodiments 12-23.

32. The network node of any of Embodiments 28-29, wherein the network node is a core network node.

33. The network node of any of Embodiments 28-29, wherein the network node is a Trusted Non-3GPP Gateway Function, TNGF.

34. The computer program and/or computer program product of any of Embodiments 30-31, wherein the network node is a core network node.

35. The computer program and/or computer program product of any of Embodiments 30-31, wherein the network node is a Trusted Non-3GPP Gateway Function, TNGF.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
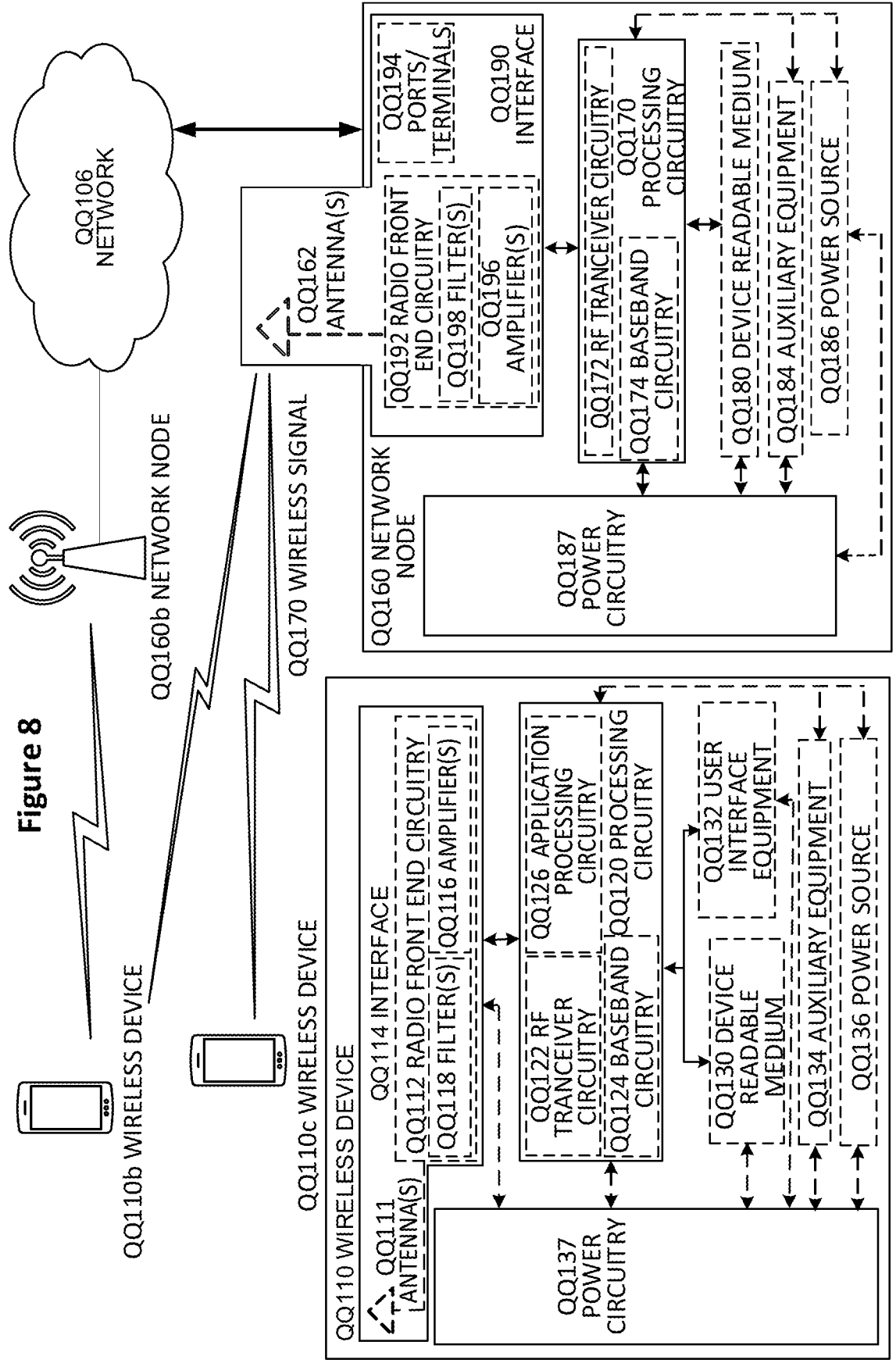
FIG. 8 is a block diagram of a wireless network in accordance with some embodiments.

FIG. 8 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
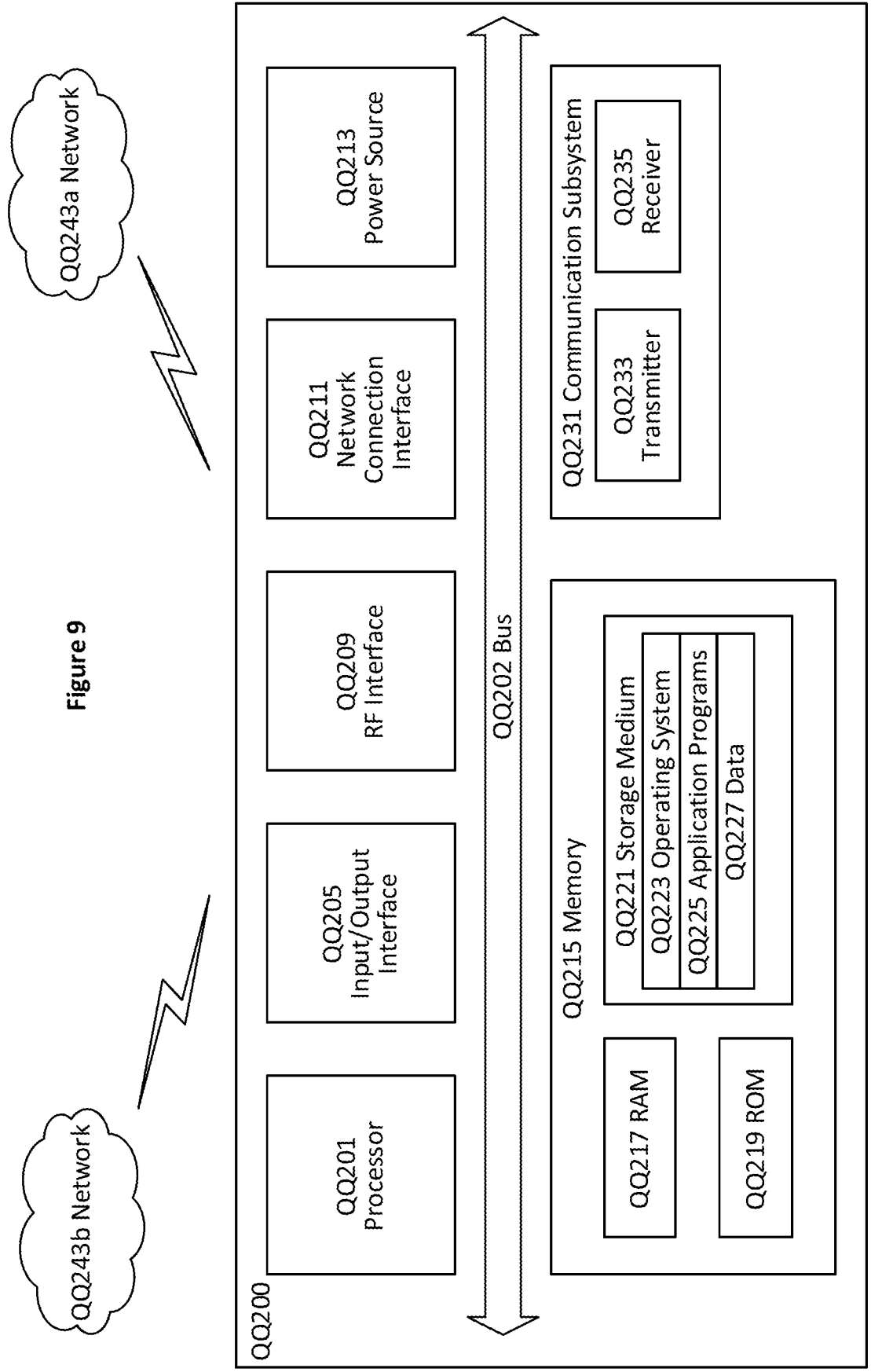
FIG. 9 is a block diagram of a user equipment in accordance with some embodiments

FIG. 9 illustrates a user Equipment in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
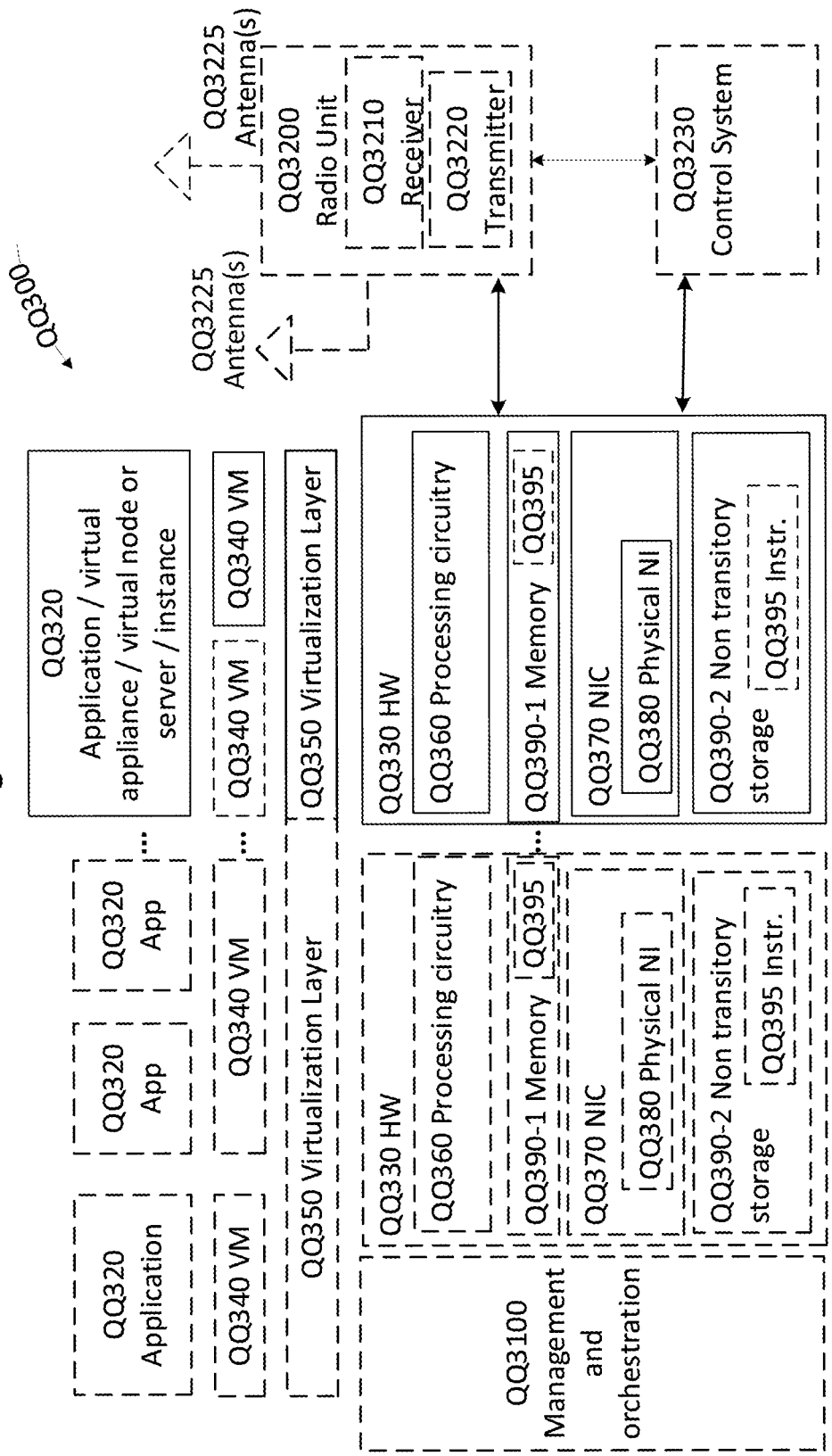
FIG. 10 is a block diagram of a virtualization environment in accordance with some embodiments.

FIG. 10 illustrates a virtualization environment in accordance with some embodiments.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 11:
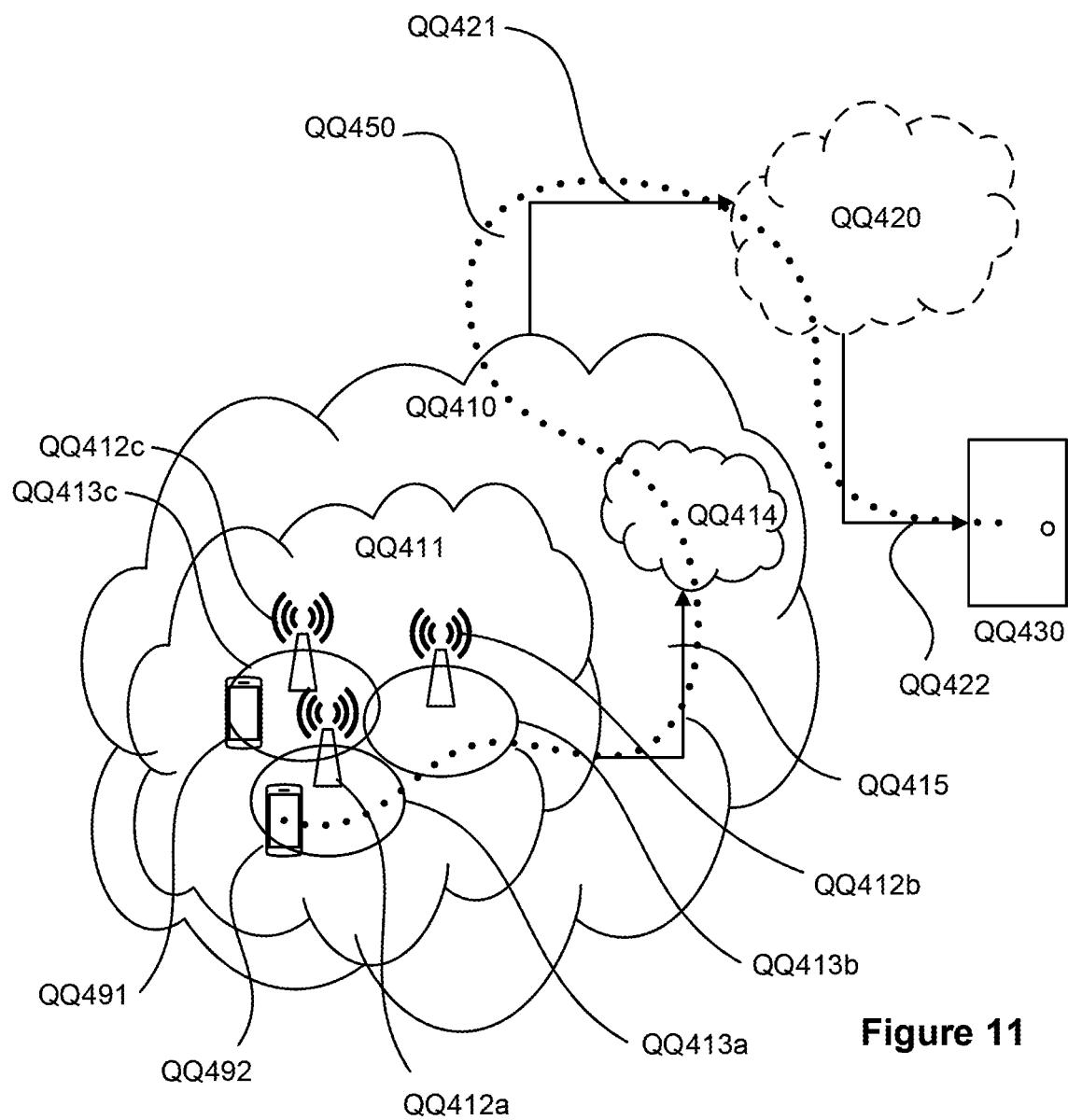
FIG. 11 is a block diagram of a telecommunication network connected via an intermediate network to a host computer in accordance with some embodiments.

FIG. 11 illustrates a telecommunication network connected via an intermediate network to a host computer in accordance with some embodiments.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 12:
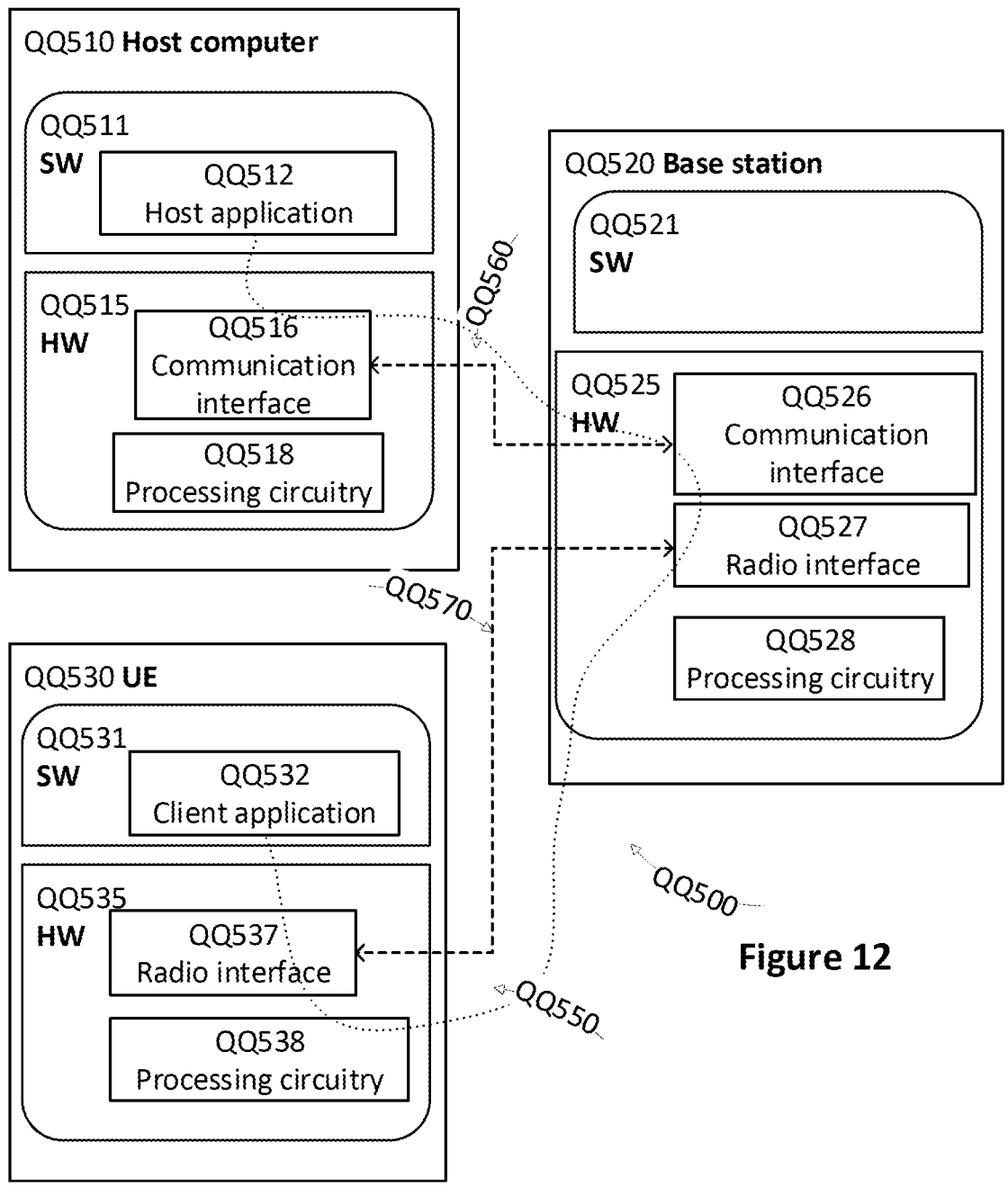
FIG. 12 is a block diagram of a host computer communicating via a base station with a user equipment over a partially wireless connection in accordance with some embodiments.

FIG. 12 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
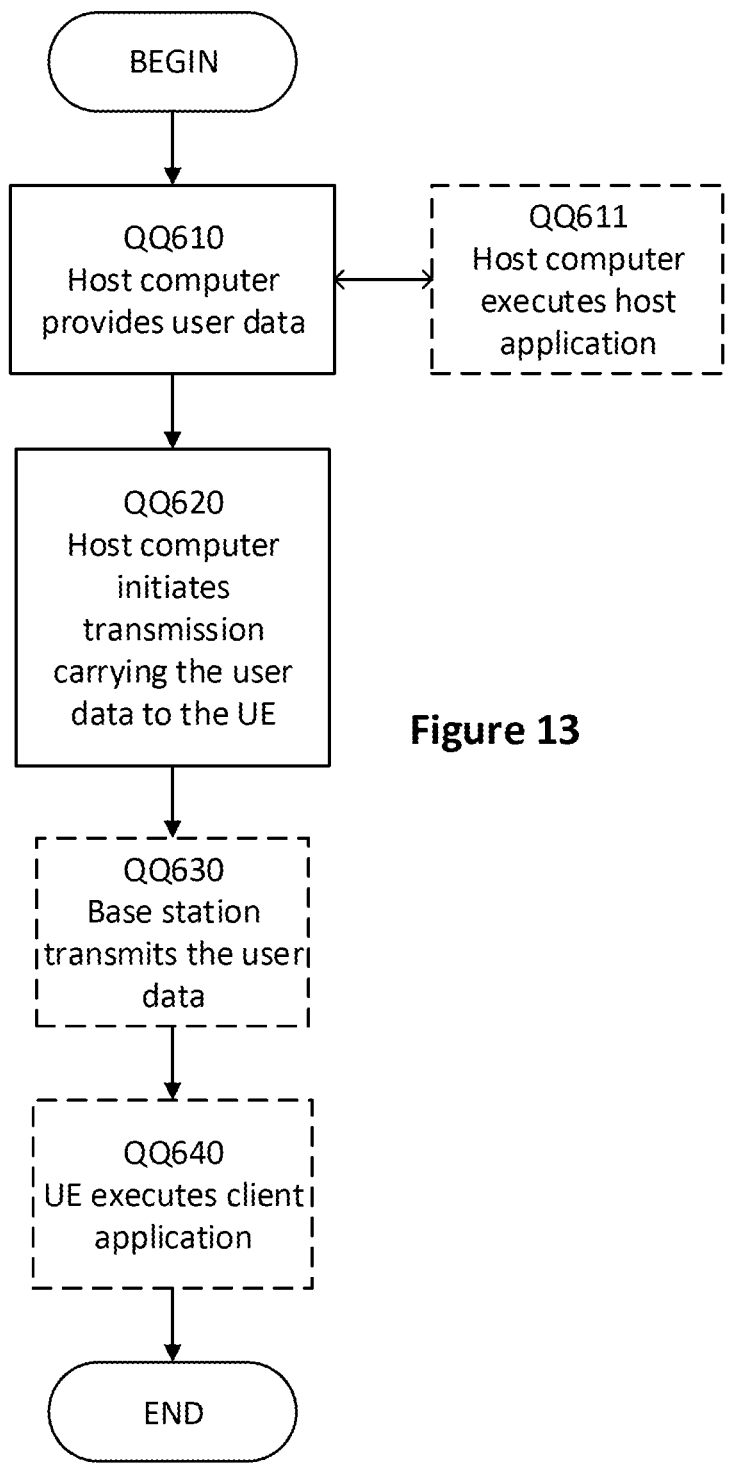
FIG. 13 is a block diagram of methods implemented in a communication system including a host computer, a base station and a user equipment in accordance with some embodiments.

FIG. 13 illustrates methods implemented in a communication system including a host computer, a base station and a user equipment in accordance with some embodiments FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
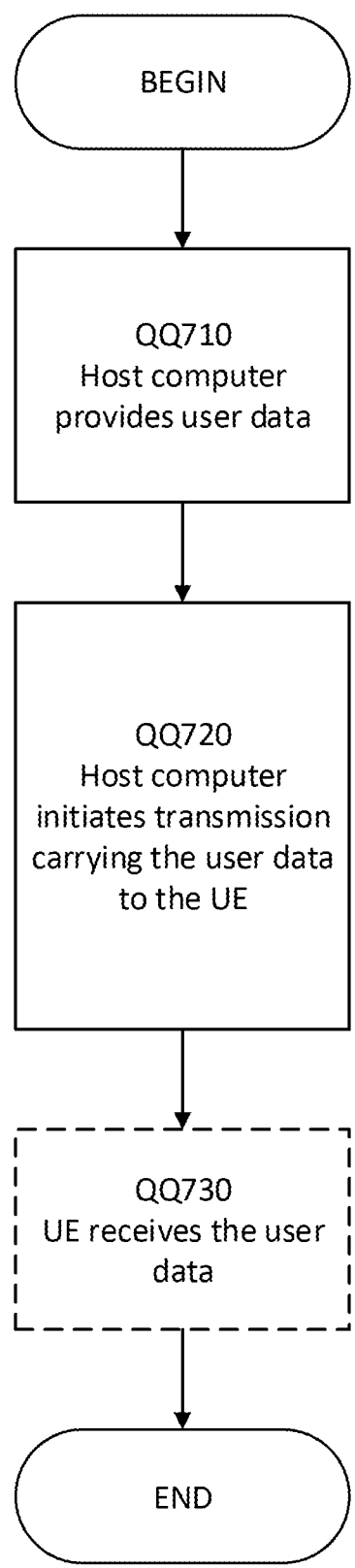
FIG. 14 is a block diagram of methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 15:
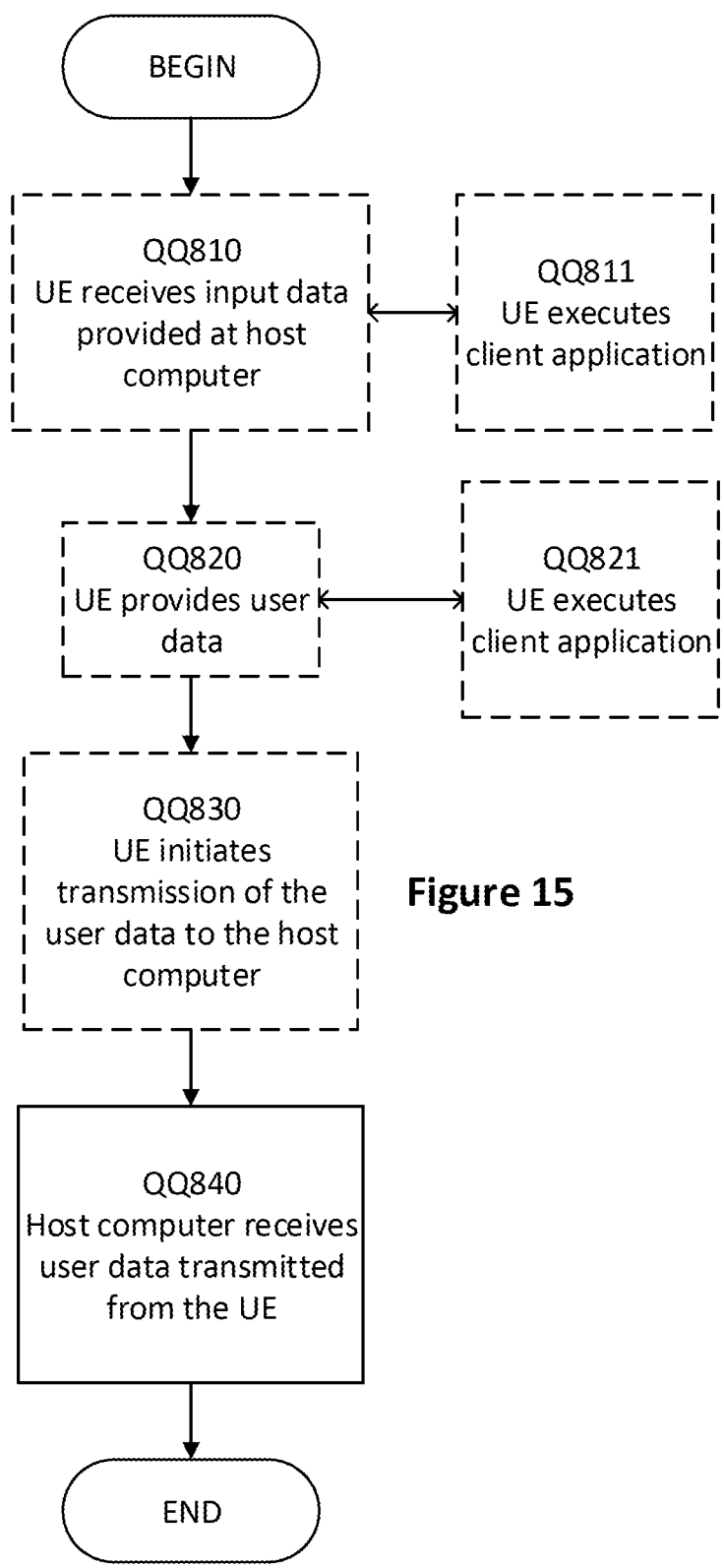
FIG. 15 is a block diagram of methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
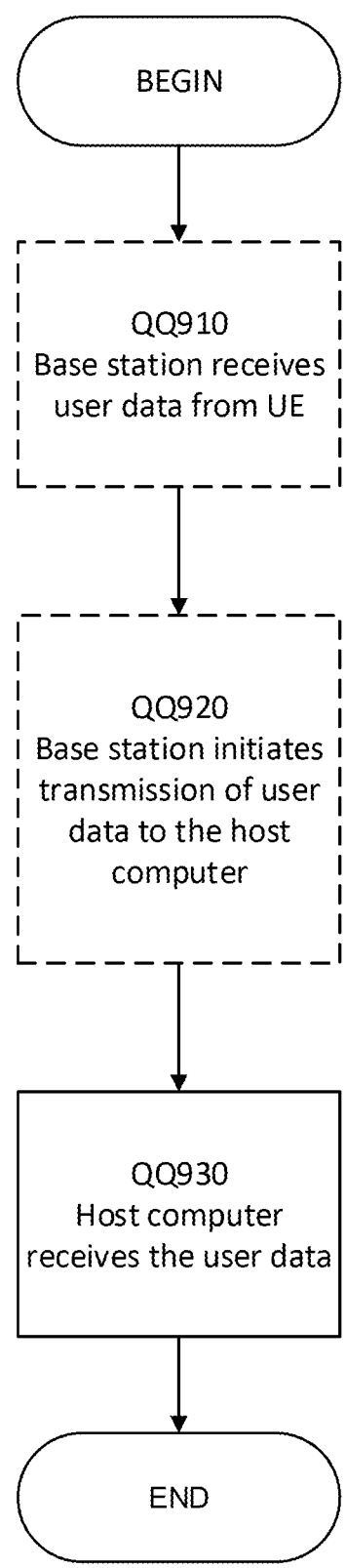
FIG. 16 is a block diagram of methods implemented in a communication system including a host computer, a base station and a user equipment in accordance with some embodiments.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Explanations are provided below for various abbreviations/acronyms used in the present disclosure.

| Abbreviation | Explanation |
| --- | --- |
| AKA | Authentication and Key Agreement |
| AMF | Access and Mobility Management Function |
| AUSF | Authentication Server Function |
| EAP | Extended Authentication Protocol |
| EMSK | Extended Master Session Key |
| ERP | EAP Re-authentication Protocol |
| rIK | re-authentication Integrity Key |
| rMSK | re-authentication Master Session Key |
| rRK | re-authentication Root Key |
| TNAP | Trusted Non-3GPP Access Point |
| TNGF | Trusted Non-3GPP Gateway Function |

Citations are provided below for references identified in the present disclosure.

Reference [1] 3GPP TS 23.502, v.16.2.0 (2019-09): "Procedures for the 5G System"

Reference [2] IETF RFC 6696: "EAP Extensions for the EAP Re-authentication Protocol (ERP)," July 2012

Reference [3] 3GPP TR 33.807 V16.0.1 (2019-10): Technical Specification Group Services and System Aspects; Study on the security of the wireless and wireline convergence for the 5G system architecture (Release 16)

Reference [4] Ericsson, "TNAP Mobility Using ERP," S3-194293, 3GPP TSG-SA3 Meeting #97, Reno, US, 18-22 Nov. 2019

Reference [5] 3GPP TS 23.501, v.16.2.0 (2019-09): "System architecture for the 5G System"

The invention claimed is:

1. A method of providing authentication at a communication device, the method comprising:
running a primary authentication with a Trusted Non-Third Generation Partnership Project (3GPP) Gateway Function (TNGF) node to obtain a TNGF Key;
providing a re-authentication Root Key based on the TNGF key;
deriving a re-authentication Master Session Key based on the re-authentication Root Key; and
performing a security setup with a Trusted Non-3GPP Access Point (TNAP) using the re-authentication Master Session Key.

2. The method of claim 1, wherein providing the re-authentication Root Key comprises deriving a TNAP Root Key from the TNGF key, and setting the re-authentication Root Key equal to the TNAP Root Key.

3. The method of claim 1, wherein providing the re-authentication Root Key comprises setting the re-authentication Root Key equal to the TNGF Key.

4. The method of claim 1 further comprising:
deriving a re-authentication Integrity Key based on the re-authentication Root Key.

5. The method of claim 1 further comprising:
providing network communication through the TNAP based on the security setup.

6. The method of claim 1, wherein the re-authentication Master Session Key is a first re-authentication Master Session Key, wherein the securitysetup is a first securitysetup, and wherein the TNAP is a first TNAP, the method further comprising:
deriving a second re-authentication Master Session Key based on the re-authentication Root Key; and
performing a second security setup with a second TNAP using the second re-authentication Master Session Key.

7. The method of claim 6 further comprising:
providing network communication through the second TNAP based on the second security setup.

8. The method of claim 6 further comprising:
transmitting a re-authentication request through the first TNAP to the TNGF after performing the first security setup; and
receiving a re-authentication response from the TNGF through the first TNAP, wherein the re-authentication response corresponds to the re-authentication request;
wherein the second re-authentication Master Session Key is derived responsive to receiving the re-authentication response.

9. The method of claim 8, wherein the re-authentication request is an Extended Authentication Protocol Re-authentication Protocol (ERP) re-authentication request, and wherein the re-authentication response is an ERP re-authentication response.

10. The method of claim 1, wherein the primary authentication is run as a Fifth Generation Authentication and Key Agreement (5G-AKA) primary authentication or as an Extended Authentication Protocol (EAP) primary authentication.

11. A method of performing authentication using a Trusted Non-Third Generation Partnership Project (3GPP) Gateway Function (TNGF) the method comprising:
running a primary authentication with a communication device to obtain a TNGF Key;
providing a re-authentication Root Key based on the TNGF key;
deriving a re-authentication Master Session Key based on the re-authentication Root Key; and
transmitting the re-authentication Master Session Key to a Trusted Non-3GPP Access Point (TNAP) to support a security setup between the TNAP and the communication device.

12. The method of claim 11, wherein providing the re-authentication Root Key comprises deriving a Trusted Non-3GPP Access Point (TNAP) Root Key from the TNGF key, and setting the re-authentication Root Key equal to the TNAP Root Key or setting the re-authentication Root Key equal to the TNGF key.

13. The method of claim 11 further comprising:
supporting network communication for the communication device through the TNAP based on the security-setup.

14. The method of claim 11, wherein the re-authentication Master Session Key is a first re-authentication Master Session Key, wherein the securitysetup is a first security setup, and wherein the TNAP is a first TNAP, the method further comprising:
deriving a second re-authentication Master Session Key based on the re-authentication Root Key; and
transmitting the second re-authentication Master Session Key to a second TNAP to support a second security setup between the second TNAP and the communication device.

15. The method of claim 14 further comprising:
supporting network communication through the second TNAP based on the second security setup.

16. The method of claim 14 further comprising:
receiving a re-authentication request from the communication device through the first TNAP after transmitting the first re-authentication Master Session Key to the first TNAP; and transmitting a re-authentication response through the first TNAP to the communication device, responsive to receiving the re-authentication request.

17. The method of claim 16, where the second re-authentication Master Session Key is derived responsive to receiving the re-authentication request.

18. The method of claim 16 further comprising:
deriving a re-authentication Integrity Key based on the re-authentication Root Key;
wherein the second re-authentication Master Session Key is derived responsive to verifying the re-authentication request using the a re-authentication Integrity Key, and/or wherein the re-authentication response is transmitted responsive to verifying the re-authentication request using the a re-authentication Integrity Key, and/or wherein the second re-authentication Master Session Key is transmitted responsive to verifying the re-authentication request using the a re-authentication Integrity Key.

19. The method of claim 16, wherein the re-authentication request is an Extended Authentication Protocol Re-authentication Protocol (ERP) re-authentication request, and wherein the re-authentication response is an ERP re-authentication response.

20. The method of claim 11, wherein the primary authentication is run as a Fifth Generation Authentication and Key Agreement (5G-AKA) primary authentication or as an Extended Authentication Protocol (EAP) primary authentication.

* * * * *